Figure 1:
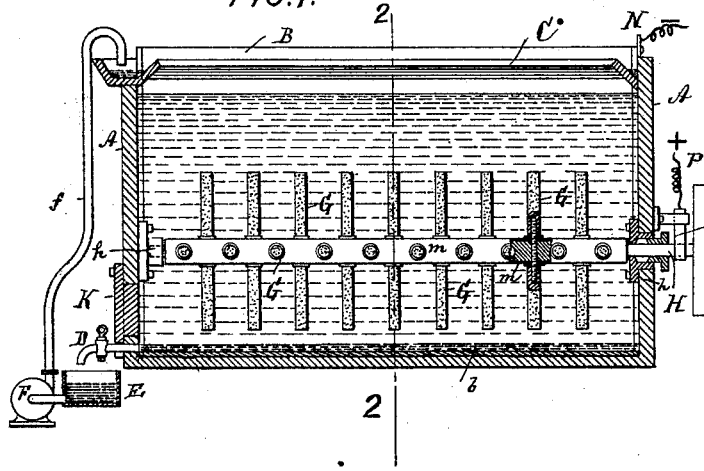

No. 619,349. Patented Feb. 14, 1899.
H. RIECKEN.
PROCESS OF AND APPARATUS FOR EXTRACTING PRECIOUS METALS FROM ORES OR SLIMES.
(Application filed Apr. 12, 1898.)
(No Model.)

Witnesses:
John Becker.
William Miller.

Inventor:
Hugo Riecken
by his attorneys
Roeder & Briesen

UNITED STATES PATENT OFFICE.

HUGO RIECKEN, OF LONDON, ENGLAND.

PROCESS OF AND APPARATUS FOR EXTRACTING PRECIOUS METALS FROM ORES OR SLIMES.

SPECIFICATION forming part of Letters Patent No. 619,349, dated February 14, 1899.

Application filed April 12, 1898. Serial No. 677,280. (No model.)

*To all whom it may concern:*

Be it known that I, HUGO RIECKEN, a citizen of the United States, and a resident of London, England, have invented certain new and useful Improvements in Processes of and Apparatus for Extracting Precious Metals from Ores or Slimes, of which the following is a specification.

This invention relates to the electrolytic extraction of the precious metals, particularly gold and silver, from ores or slimes, and has for its object to effect in one operation the solution of the precious metal from the ore and its deposition upon mercury in an easily-recoverable condition.

The process is applicable for the treatment of any auriferous ore; but it is especially valuable for the treatment of slimy and clayey ores which are unsuitable for treatment by the ordinary methods, because percolation through them is practically impossible.

Various electrolytic systems or methods have been heretofore tried in which the auriferous slimes mixed with a suitable electrolyte have been subjected to agitation in a vessel provided with electrodes. These methods have involved the use of rotary stirrers, consisting usually of carbon rods constituting the anode, the cathode being of mercury, which lies in a more or less quiescent state at the bottom of the vessel. Such methods are, however, objectionable, because the surface of the mercury cathode is necessarily very limited in area, and its action is, moreover, greatly interfered with by the insulating effect of the layer of the heavier particles of ore which inevitably settle upon it, and the mercury becomes active only when for the moment the overlying body of ore is removed by mechanical means. In order to effect a rapid and complete precipitation of the gold upon the mercury cathode, it is necessary, first, that the surface of the mercury should be constantly or frequently renewed; second, it should be as large as possible, and, third, it should be so disposed that the ore does not settle upon it. If these conditions are not observed, the gold is precipitated in a pulverulent and loosely-adherent state and is easily scoured off by the movement of the ore and only a partial extraction and recovery of the gold results. My present invention insures the aforesaid essential conditions to a high efficiency of extraction and causes the gold to collect in the form of a closely-adhering amalgam upon the sheet-metal portion of the cathode. The electrolyte may be cyanid of potassium, chlorid or bromid of sodium in solution jointly or separately, or other similar salt.

For the purposes of my invention I employ a vat having a semicircular or angular or other suitably-shaped converging bottom and vertical or inclined sides and lined with copper or other suitable metal, which may be silver-plated. At the lowest point of the lining may be arranged a gutter for the reception of mercury, and near the upper edge of the lining is a pocket or trough extending wholly or partially around the lining and having openings or a slit over the metallic surface. The mercury is continuously or intermittently withdrawn from the bottom of the vessel through a tap and is raised by hand or otherwise and delivered into the pocket or trough aforesaid, whence it escapes through the slit or holes and descends in streams over the lining back into the gutter, a circulation of the mercury and a large and clean continuously-changing cathode surface being thus maintained. The advantage of this large surface is that the gold and silver is rapidly deposited thereon as an amalgam, from which the precious metal can be readily obtained, and this deposition is effected with a minimum amount of current due to the low resistance.

The anode is composed of rods or plates of carbon, metal, or other conductive material fixed to a shaft, which is rotated or oscillated by any suitable means to agitate the ore. It is connected to the positive pole of a dynamo or other source of electric energy, the lining of the vat being connected to the negative pole.

Figure 2:
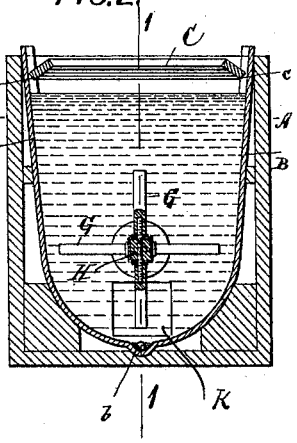
Figure 3:
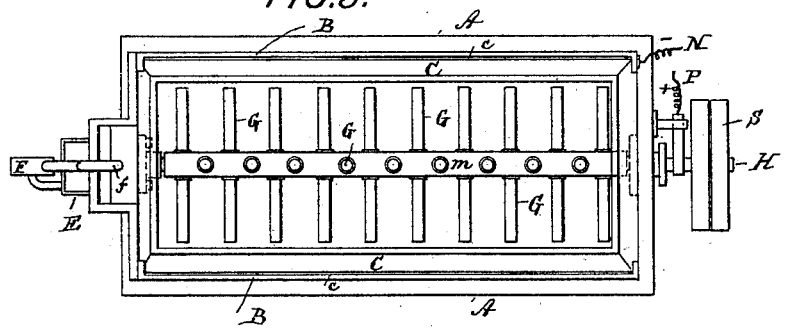
Figure 4:
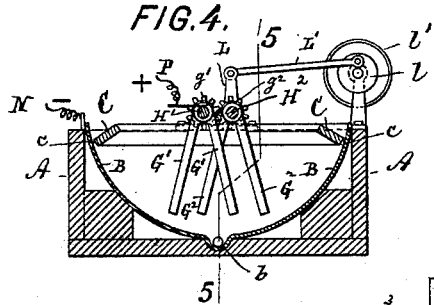
Figure 5:
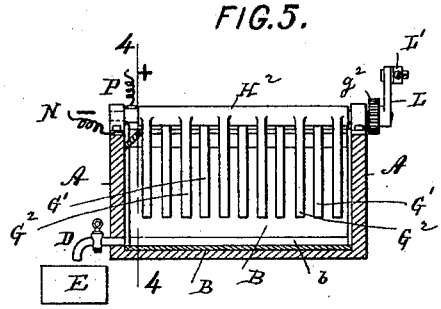

In the accompanying drawings, Figure 1 is a longitudinal section of an apparatus for carrying my invention into effect on line 1 1, Fig. 2. Fig. 2 is a transverse section of the same on line 2 2, Fig. 1. Fig. 3 is a plan; Fig. 4, a transverse section of a modification on line 4 4, Fig. 5; Fig. 5, a longitudinal section on line 5 5, Fig. 4; and Fig. 6, a transverse section of a further modification.

Referring to Figs. 1, 2, and 3, A is a tank or vat having a metal lining B, the sides of which are inclined and the bottom of which is converging. Formed in the bottom of the lining is a longitudinal gutter b, and near the top of the lining, on each side, is a trough or pocket C, having perforations or a longitudinal narrow slit c over the metal lining. The pocket C may, if desired, be continuous all around the vat. The mercury, which is withdrawn continuously or intermittently from the gutter b through the tap D, is collected in a receptacle E, where it may be treated with water for the removal of the alkali metal. The mercury is then raised by hand or by a pump F or otherwise and delivered through pipe f into the pocket C, whence it descends through the slits c over the lining in thin streams and recollects in the gutter b.

The cathode does not consist of the metal lining alone nor of the flowing sheet of mercury alone, but of both combined.

The anode is formed of rods G, of carbon, metal, or other conductive material, projecting radially from a shaft H, which turns in bearings h h and is actuated from driving-pulley S or otherwise. The carbon rods G are shown to be attached to the shaft H by means of screws M, having both of their ends threaded and tapped into opposite rods.

J is a stuffing-box to prevent leakage of the electrolyte and slimes through the end of the vat. In some instances the driving apparatus is contained wholly within the vat, in which case the shaft does not extend through the ends of the vat and the stuffing-box is dispensed with. The part of the shaft H within the vat is properly insulated by jacket m or otherwise to protect it from electrolytic action, and it is connected, as before stated, to the positive pole of a dynamo or other source of electricity at P, the lining of the vat being connected to the negative pole of said source at N.

The slimy ores may be first mixed to a pulp of suitable consistency and are introduced into the vat, or they may be introduced gradually into the vat without being first mixed to a pulp. The vat contains a suitable electrolyte—for instance, a weak solution of cyanid of potassium, to which may be added a salt, such as sodium chlorid, which under electrolysis yields oxygen or an equivalent oxidizing agent to accelerate the solution of the gold. The pulp is kept agitated by the anode stirrers G or otherwise and a current of electricity of suitable strength is continuously or intermittently passed through the vat, while the mercury is maintained in circulation in the the manner above stated or by any other suitable means. The anion which is generated at the anode gradually dissolves the precious metal which, together with the potassium, is deposited upon the cathode, and both amalgamate with the mercury. Thus the gold is collected in the form of a closely-adhering amalgam, dense and hard, upon the sheet-metal portion of the cathode, while the cathode-plates remain constantly white and bright. The alkaline metal amalgam greatly facilitates the deposition and amalgamation of the gold. Any coarse particles of gold present in the ore are of course immediately amalgamated. If the gold in the ore is in a finely-divided state and soluble in the electrolyte without the aid of electrolysis, its solution will be greatly accelerated by the agitation of the stirrers. The current may then be used to precipitate the dissolved gold, which is accomplished in a comparatively short space of time, due to the large surface of the cathode employed. When it is desired to empty the vat, a manhole K, provided in the end of the vat, is opened and the finer slimes are allowed to run out and settle. The coarser particles, among which may be found some of the gold amalgam, may then be separated on concentrating-tables or otherwise and the amalgam treated in the ordinary manner. By far the largest quantity of gold will be found deposited upon the sides of the vat as an amalgam, and the same can from time to time be scraped off and treated in the usual manner in a retort.

The vat may be made of any desired capacity and may be constructed to receive very large charges of ore.

In Figs. 4 and 5 I have shown a form of apparatus having oscillatory anode stirrers, and in this case the lining of the vat is much shallower than in Fig. 1 and approximately semi-cylindrical in shape. I have shown two sets of anode stirrers each composed of arms $G'$ $G^2$, mounted on shafts $H'$ and $H^2$, respectively, and arranged so that the arms of one set pass between those of the other. The shafts $H'$ and $H^2$ are geared together by pinions $g'$ $g^2$, so as to rock in unison, and they may be oscillated by any suitable means—for instance, by a crank-arm L, connected by a link $L'$ to the wrist-pin of a crank-disk $l$, which is rotated through a driving-pulley $l'$. The construction is otherwise similar to that illustrated in Figs. 1 to 3 and need not be further described.

Figure 6:
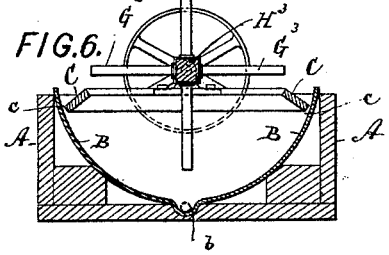

In Fig. 6 the vat is similar to that shown in Figs. 4 and 5; but the anodes $G^3$ in this case are fixed to a rotary shaft $H^3$, received by bearings which are fitted to the upper edge of the vat and above the surface of the pulp.

What I claim is—

1. A step in the process of extracting precious metals from ores or slimes which consists in causing mercury to descend in a thin film over a metallic surface forming a cathode, agitating the pulp, dissolving the precious metals by passing a current through the pulp to the cathode, and depositing them in an adherent layer upon the cathode, substantially as specified.

2. The process of extracting precious metals from ores or slimes by electrolysis which consists in agitating a mixture of the ores or slimes and an electrolyte in the presence of an anode, causing a stream of mercury to descend in a thin film over a metallic surface forming a cathode, passing a current through the pulp to the cathode and thereby amalgamating the precious metals and depositing them in an adherent layer upon the cathode, collecting the descending mercury, and reconveying it to the top of the metallic surface, substantially as specified.

3. An electrolytic apparatus for extracting precious metals from ores or slimes which consists of a vessel having an inner metallic cathode surface, an anode, means for agitating the contents of the vessel, a perforated or open pocket near the upper end of the vessel, and mercury within such pocket which is adapted to descend over the metallic surface, substantially as specified.

4. An electrolytic apparatus for extracting precious metals from ores or slimes which consists of a vessel having an inner metallic cathode surface and bottom, a gutter within such bottom, a movable anode, a perforated or open pocket near the upper end of the vessel, and mercury within such pocket which is adapted to descend over the metallic surface and into the gutter, substantially as specified.

5. An electrolytic apparatus for extracting precious metals from ores or slimes which consists of a vessel having an inner inclined metallic cathode surface and a converging bottom, a movable anode, a perforated or open pocket near the upper end of the vessel, mercury within such pocket adapted to descend over the metallic surface, and means for reconveying the mercury from the bottom of the vessel into the pocket, substantially as specified.

Signed by me, at London, England, this 22d day of March, 1898.

HUGO RIECKEN.

Witnesses:
T. J. OSMAN,
W. J. NORWOOD.